Oct. 18, 1960 W. J. BARTHOLOMÄUS 2,956,647
THROTTLING MECHANISM FOR BRAKES
Filed April 22, 1955

Inventor
WERNER J. BARTHOLOMÄUS
BY Dicke and Craig
ATTORNEYS.

United States Patent Office 2,956,647
Patented Oct. 18, 1960

2,956,647
THROTTLING MECHANISM FOR BRAKES

Werner J. Bartholomäus, Stuttgart, Germany, assignor to Daimler-Benz Aktiengesellschaft, Stuttgart-Unterturkheim, Germany Filed Apr. 22, 1955, Ser. No. 503,289

Claims priority, application Germany Apr. 30, 1954

6 Claims. (Cl. 188—90)

The present invention relates to a hydraulic brake of a vehicle of the type equipped with a pump which is geared to the wheels of the vehicle, preferably by means of the transmission thereof, and circulates a stream of liquid through a throttling mechanism, the latter converting the mechanical energy of the vehicle into heat.

In prior hydraulic brakes for vehicles a throttling mechanism was usually employed comprising a valve permitting to locally reduce the cross section of the stream of liquid causing vehement turbulence in the stream upon passage therethrough to thereby convert the hydrodynamic energy into heat and to thereby produce an abrupt reduction of hydraulic pressure in the stream of liquid. The local reduction of the cross section of the stream in the valve is disadvantageous. Owing to the phenomenon known as "cavitation" it is liable to cause the liquid to foam, particularly where the liquid is oil, such foam resulting in an unstable fluctuating pressure drop. The excessive turbulence created in the stream of liquid upon passage through the restricted cross section is liable to cause excessive wear of the walls of the conduit. Moreover, the generation of heat is concentrated within a small area and is, therefore, liable to result in the production of excessive temperatures.

It is the object of the present invention to provide an improved throttling mechanism, particularly for the purpose described, capable of offering an adjustable resistance of high constancy to the stream of liquid circulated therethrough.

Other objects are to provide an improved throttling mechanism in which the generation of heat is distributed over a comparatively large area wherefrom the heat may be readily dispersed and in which turbulence of the liquid is reduced to a minimum to avoid foaming of the liquid and to reduce wear.

Further objects of my invention will appear from the detailed description of a number of preferred embodiments of my invention following hereinafter, and the features of novelty will be pointed out in the claims. I wish it to be clearly understood, however, that such detailed description serves the purpose of illustrating the invention rather than that of limiting or restricting the same.

Figure 1:
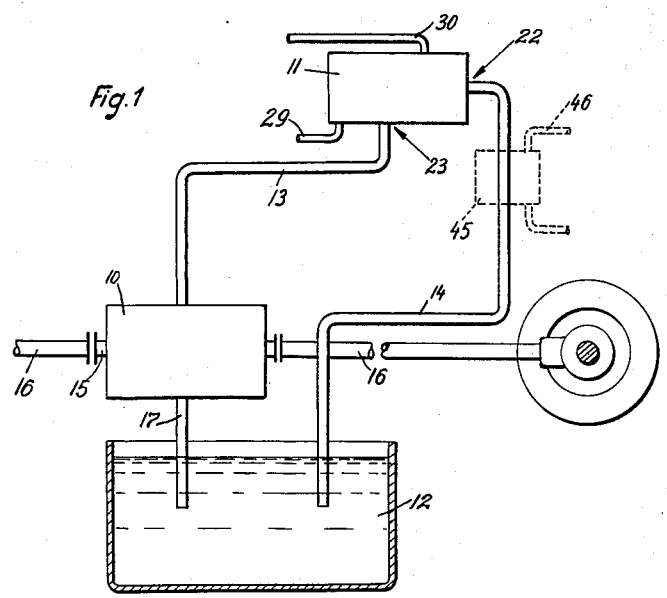
Figure 2:
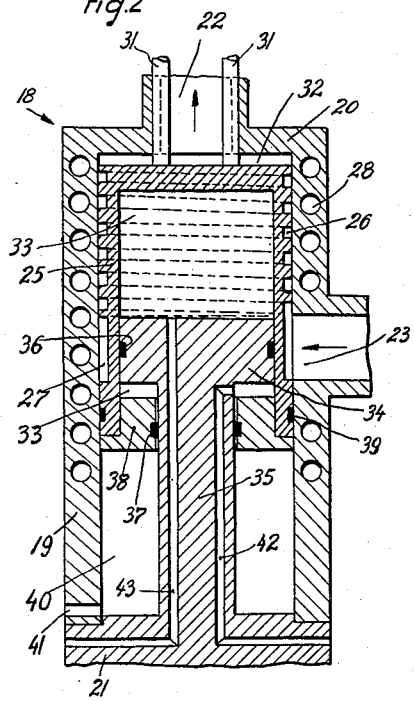
Figure 3:
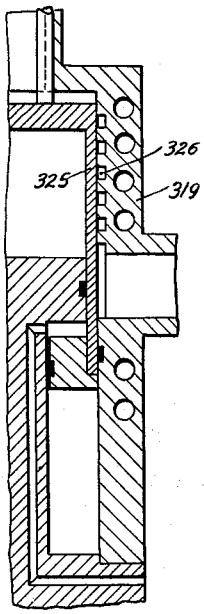
Figure 4:
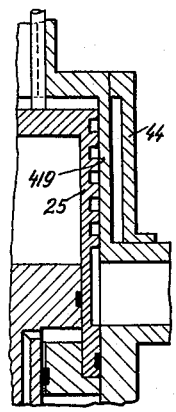

In the accompanying drawings in which various embodiments of the invention are shown by way of example, Fig. 1 is a diagrammatic illustration of a hydraulic brake of a vehicle including a pump and the improved throttling mechanism, Fig. 2 is a partial axial section through the throttling mechanism, Fig. 3 is a partial section similar to that of Fig. 2 of a modified throttling mechanism, and Fig. 4 is a partial section similar to that of Figs. 2 and 3 of a further modification of the throttling mechanism.

The hydraulic brake of a vehicle illustrated in Fig. 1 comprises a pump 10, a throttling mechanism 11, a reservoir 12 for a suitable liquid, such as oil, and connecting pipes 13 and 14 enabling the pump 10 to circulate the liquid through the throttling mechanism 11. The pump 10 is preferably a pump of the volumetric type having a constant or a variable piston displacement. Its shaft 15 is geared to the wheels of the vehicle in any suitable manner. In Fig. 1 shaft 15 is shown as being inserted in the transmission shaft 16 of the vehicle.

The pump sucks the liquid from the reservoir 12 through a pipe 17 and feeds it via pipe 13 through the throttling mechanism wherefrom the liquid is returned to reservoir 12 by the pipe 14. The throttling of the liquid effected by the mechanism 11 increases the hydraulic pressure prevailing in pipe 13, and such hydraulic pressure causes the pump 10 to exert a braking couple upon its shaft 15. This braking couple is transmitted by the shaft 16 to the wheels of the vehicle.

The throttling mechanism 11, which forms the subject matter of the present invention, comprises a cylinder 18 having a peripheral wall 19 and end walls 20 and 21. In the embodiment shown, the end wall 20 is integral with the peripheral wall 19, while the end wall 21 is suitably fixed to the peripheral wall 19 by suitable bolts not shown.

The cylinder 18 is provided with an outlet port 22 and an inlet port 23, such ports being disposed in axially spaced relationship. At least one of the ports, to wit port 23, is provided in the internal cylindrical face of the cylinder. The other port 22 may be provided in one of the end walls, such as 20. A piston 25 is slidably guided in the cylinder.

For the purpose of the present invention, a helical groove 26 is provided in the external cylindrical face of the piston 25 so as to form a conduit establishing a communication between the port 22 and the port 23. Preferably, the helical groove 26 terminates in a peripheral recess 27 of the piston which, when the latter is in its topmost position as shown in Fig. 2, registers with the port 23. This port communicates with pipe 13, whereas port 22 communicates with pipe 14. Therefore, the liquid fed by the pump through pipe 13 enters port 23 and recess 27 and streams through the conduit formed by groove 26 into the upper end of the cylinder and thence through port 22 from which it is returned to the reservoir 12 by the pipe 14. The conduit 26 has a restricted cross section. As a result, the hydrostatic energy of the stream is converted into heat by friction of the liquid with the walls of the conduit.

Means are provided for conducting such heat from the walls of the conduit 26 in a direction away therefrom. For this purpose, the peripheral wall 19 of the cylinder may be formed with a helical internal duct 28 through which a cooling liquid is conducted. The means for cooling the cylinder include a pipe 29 supplying cooling water to one end of the duct 28, and a pipe 30 for the discharge of the cooling water from the other end thereof.

The jet thrust of the stream issuing from the upper end of conduit 26 in tangential direction tends to impart rotation to piston 25. In order to reduce wear, means are preferably provided for holding the piston 25 in the cylinder 19 against relative rotation. In the embodiment shown, two parallel guide pins 31 serve this purpose which are secured to the piston 25 to extend parallel to the axis thereof and are slidably guided in grooves provided in the internal face of port 22.

The effective length of the conduit established by the helical groove 26 may be varied by relative axial displacement of said piston and said cylinder. In the embodiment shown, the effective length of the conduit amounts to five and a half convolutions of the groove 26. It will be readily appreciated that when the distance between the top face 32 of the piston and the port 23 is reduced fifty percent, the liquid will no longer enter the recess 27, but will directly flow into the groove 26 at a point intermediate the recess 27 and the top face 32 and, therefore, needs pass through a little less than three convolutions of the groove 26 only, whereby the throttling effect is reduced about fifty percent. It may be reduced to zero by a downward displacement of the piston all the way causing the top face 32 thereof to expose the port 23 thereby establishing a direct communication between the two ports 22 and 23.

Preferably, fluid-operable means are provided for relatively adjusting the cylindrical body 19 and the piston 25. For this purpose, the piston 25 may be provided with a cylindrical cavity 33 in which a secondary double-acting piston 34 is slidably mounted. The piston 34 has a piston rod 35 which connects the secondary piston 34 to the end wall 21. Suitable sealing means, such as 36, are provided between the periphery of the piston 34 and the wall of the cavity 33. Similarly, a seal 37 is provided to seal the lower end wall 38 of the piston 25 against the piston rod 35. A peripheral seal 39 is provided in the external periphery of piston 25 near the lower end thereof. The space 40 below the piston 25 has a vent 41. The piston rod 35 and the secondary piston 34 are provided with separate ducts 42 and 43 for the admission and discharge of a liquid under pressure to and from opposite ends of the cylindrical cavity 33 to thereby effect relative displacement of the piston 25 and the cylinder 19.

The admission and discharge of the liquid under pressure to and from the conduits 42, 43 may be controlled by a suitable reversing valve, not shown, which is connected to any suitable source of pressure.

When the parts assume the position shown in Fig. 2, the circulating liquid fed by the pump 10 to the throttling mechanism 11 through the pipe 13 must enter the port 23 of the cylinder 19 and flow from the wide recess 27 of piston 25 through the helical groove 26. Owing to the restricted cross section and the great length of the groove the hydrostatic energy of the stream is converted into heat by friction of the liquid with the walls of the conduit formed by groove 26. Therefore, when the liquid enters the space between the upper top wall 32 of the piston and the end wall 20 of the cylinder its pressure will be considerably reduced. From port 22 the liquid will be returned to the reservoir 12 by pipe 14. The reduction in pressure of the liquid permits the pump 10 to maintain a constant high pressure in pipe 13 and to exert a considerable braking torque upon its shaft 15. The generation of the heat produced by the friction of the liquid with the walls of conduit 26 is distributed over the large area of the peripheral surface of the piston and, therefore, will not result in the production of excessive temperatures. The heat produced will be readily dissipated and carried away by the cooling water flowing through duct 28. When the piston 25 is moved downwardly by the admission of fluid under pressure through duct 42 into the lower end of cavity 33 and by the discharge of liquid from the upper end of cavity 33 through the duct 43, the convolutions of the groove 26 will progressively register with the inlet port 22 whereby the throttling effect will be decreased. When the piston 25 arrives in its lowermost position it will permit the liquid to flow directly from the inlet port 22 to the outlet port 23 whereby the throttling effect will disappear so that the pump 10 will exert no substantial braking couple upon its shaft.

The embodiment illustrated in Fig. 2 is capable of numerous modifications. Thus, the cross section of groove 26 need not be rectangular, but may have any other desired shape. The seal 39 may be dispensed with, if desired. In lieu of the fluid-controlled means for moving the piston 25 in the cylinder 19 any other suitable mechanism may be provided for such purpose.

The duct 28 for the cooling liquid may be replaced by a cooling jacket. That is illustrated in Fig. 4 where a separate cooling jacket 44 surrounds the cylinder 419 which otherwise corresponds to cylinder 19. A heat-exchanging device diagrammatically indicated at 45 in dotted lines supplied with cooling water through a pipe 46 may be inserted in pipe 14, if desired, to thereby provide means for dissipating the heat generated in the conduit 26.

The embodiment illustrated in Fig. 3 differs from that described with reference to Fig. 2 by the provision of the helical duct in the internal peripheral face of the cylinder rather than in the external cylindrical face of the piston. As shown in Fig. 3, the piston 325 has a smooth external cylindrical face. Otherwise it is similar to piston 25. The helical groove 326 is cut into the internal face of cylinder 319. Otherwise this cylinder is similar to cylinder 19.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A throttling mechanism for a hydraulic vehicle brake comprising a cylinder having end walls, an inlet port and an outlet port, said ports being disposed in axially spaced relationship, at least one of said ports being provided in the internal cylindrical face of said cylinder, a piston having an external cylindrical face slidably guided in said cylinder, a helical groove being provided in one of said cylindrical faces forming a conduit establishing a communication between said ports, the effective length of said conduit being variable by axial relative displacement of said piston and said cylinder, said piston being provided with a cylindrical cavity, a secondary double-acting piston slidably mounted in said cylindrical cavity, a piston rod connecting said secondary piston to one of said end walls, said piston rod and said secondary piston being provided with separate ducts for the admission and discharge of a liquid under pressure to and from opposite ends of said cylindrical cavity to thereby effect relative displacement of said piston and said cylinder, means for holding said piston in said cylinder against relative rotation, means for circulating a liquid stream to be throttled through said ports thereby causing the hydrostatic energy of said stream to be converted into heat by friction of said liquid with the walls of said conduit, and means for cooling said cylinder.

2. A hydraulic brake of a vehicle comprising a pump having a drive shaft geared to the wheels of the vehicle to be driven by the rotation of said wheels for feeding a stream of liquid, a pair of relatively movable elements having faces slidable upon each other, a groove in at least one of said faces forming a conduit of restricted cross section, means for relatively adjusting said elements to variably expose said groove to thereby vary the length of said conduit, means for circulating said stream through said conduit causing the hydrostatic energy of said stream to be converted into heat by friction of the liquid with the walls of said conduit, and means for cooling at least one of said elements in the vicinity of said groove, one of said relatively movable elements being formed with an internal duct which forms part of said means for cooling and is disposed in the vicinity of said faces for conducting a cooling liquid.

3. A hydraulic brake of a vehicle comprising a pump having a drive shaft geared to the wheels of the vehicle to be driven by the rotation of said wheels for feeding a stream of liquid, a pair of relatively movable elements having faces slidable upon each other, a groove in at least one of said faces forming a conduit of a restricted cross-section, means for relatively adjusting said elements to variably expose said groove to thereby vary the length of said conduit, means for circulating said stream through said conduit causing the hydrostatic energy of said stream to be converted into heat by friction of the liquid with the walls of said conduit, and a cooling jacket provided on one of said movable elements in the vicinity of said groove.

4. A hydraulic brake of a vehicle comprising a pump having a drive shaft geared to the wheels of the vehicle to be driven by the rotation of said wheels for feeding a stream of liquid, a hollow body having an internal cylindrical surface, a piston having an external cylindrical surface slidable in said body, a helical groove in one of said cylindrical surfaces, means for relatively adjusting said body and said piston in the axial direction of the latter, means for circulating said stream through said groove, and a cooling jacket provided on said body adjacent to said groove.

5. A hydraulic brake of a vehicle comprising a pump having a drive shaft geared to the wheels of the vehicle to be driven by the rotation of said wheels for feeding a stream of liquid, a conduit of restricted cross section, means for circulating said stream through said conduit causing the hydrostatic energy of said stream to be converted into heat by friction of the liquid with the wall of said conduit, means for varying the effective length of said conduit of restricted cross section, a cooling duct disposed adjacent to said conduit in heat exchange relationship therewith, and means for conducting a cooling liquid through said duct.

6. A hydraulic brake of a vehicle comprising a pump having a drive shaft geared to the wheels of the vehicle to be driven by the rotation of said wheels for feeding a stream of liquid, a hollow body having an internal cylindrical surface, a piston having an external cylindrical surface slidable in said body, a helical groove in one of said cylindrical surfaces, the other one of said cylindrical surfaces being smooth, means for relatively adjusting said body and said piston in the axial direction of the latter, means for circulating said stream through said groove, said hollow body being provided with a cooling duct adjacent to said internal cylindrical surface, and means for conducting a cooling liquid through said duct.

References Cited in the file of this patent
UNITED STATES PATENTS

| | | |
|---|---|---|
| 1,629,120 | Ripple | May 17, 1927 |
| 1,631,800 | Dotsch | June 7, 1927 |
| 1,754,138 | Agee | Apr. 8, 1930 |
| 1,918,959 | Culp | July 18, 1933 |
| 1,980,085 | Perry et al. | Nov. 6, 1934 |
| 2,065,832 | Spyker | Dec. 29, 1936 |
| 2,152,570 | Scates | Mar. 28, 1939 |
| 2,324,360 | Camerota | July 13, 1943 |
| 2,640,563 | Sanders | June 3, 1953 |
| 2,681,713 | Chambers | June 22, 1954 |
| 2,706,620 | Graves | Apr. 19, 1955 |

FOREIGN PATENTS

| | | |
|---|---|---|
| 651,617 | Germany | Oct. 16, 1937 |
| 289,229 | Switzerland | June 16, 1953 |